United States Patent [19]

Benbassat et al.

[11] Patent Number: 4,700,322
[45] Date of Patent: Oct. 13, 1987

[54] GENERAL TECHNIQUE TO ADD MULTI-LINGUAL SPEECH TO VIDEOTEX SYSTEMS, AT A LOW DATA RATE

[75] Inventors: Gerard V. Benbassat, St. Paul; Daniel Serain, Nice, both of France

[73] Assignee: Texas Instruments Incorporated, Dallas, Tex.

[21] Appl. No.: 614,351

[22] Filed: May 25, 1984

[51] Int. Cl.⁴ ............................................. G10L 5/00
[52] U.S. Cl. .................. 364/513.5; 381/51; 364/900
[58] Field of Search ............. 358/342; 381/36, 51–53; 364/513.5

[56] References Cited

U.S. PATENT DOCUMENTS 3,829,610  8/1974  Meeussen et al. ............... 358/342
4,610,022  9/1986  Kitayama et al. .................. 381/36

FOREIGN PATENT DOCUMENTS 2014765  8/1979  United Kingdom .

OTHER PUBLICATIONS

Ludeman, "Extended Audio-Video System", IBM Tech. Disc. Bull., Oct. 1976, pp. 1546-1547.

Primary Examiner—E. S. Matt Kemeny
Attorney, Agent, or Firm—Richard K. Robinson; Rodney M. Anderson

[57] ABSTRACT

Video display of stored text is accompanied by associated speech from a speech synthesizer using coded sounds and intonation. A central processor controls selection of text and speech. Speech is selectable in one of a plurality of prestored languages coded in frequency and duration data.

5 Claims, 3 Drawing Figures

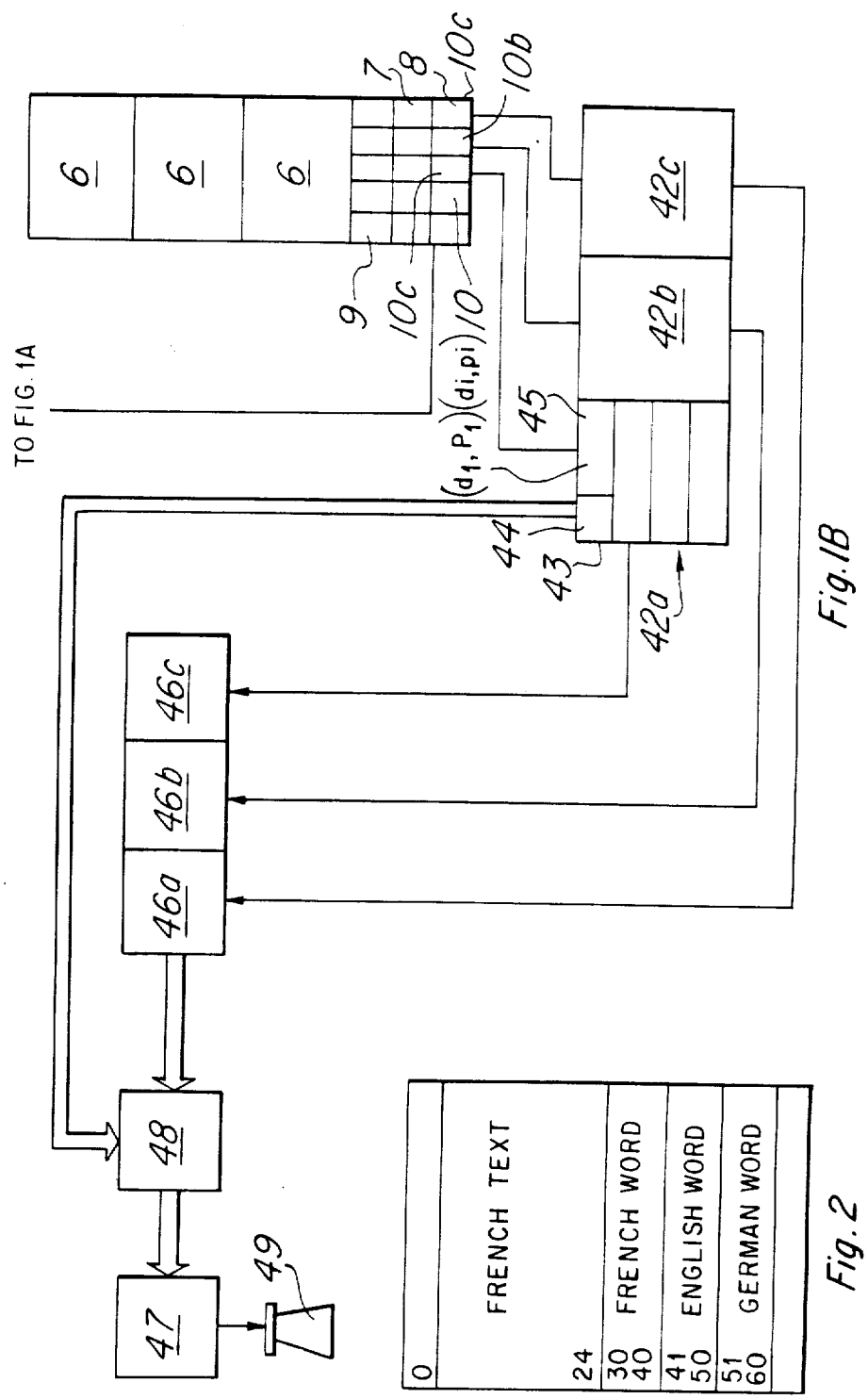

GENERAL TECHNIQUE TO ADD MULTI-LINGUAL SPEECH TO VIDEOTEX SYSTEMS, AT A LOW DATA RATE

This invention relates to the coordination of audible signals and images appearing on a display device and, more specifically, to the audition of spoken communications corresponding to messages in the form of pages displayed on the screen of a cathode ray tube.

A process and apparatus for the display of messages on a sweep frame display device, such as the screen of a cathode ray tube, are described in French patent applications Nos. 80 26 392, 80 26 393, 80 26 394, 80 26 395 of the instant applicant.

These patent applications describe a technique which provides for edition, transmission, reception, and visualization of messages containing typographic information which can be intermixed with graphical data.

These techniques are particularly applicable to a teletext system such as the Antiope system.

The invention relates to a speaking or audible teletext system which adjoins to the graphical and/or typographical data, visible on the screen of a cathode tube, audible data corresponding thereto such as, for example, commentaries on a written text, or a graphical representation, or another.

The invention has, therefore, as an object a process for the coordination of the audition of spoken messages with the visualization of messages comprising pages on a display device characterized in that it includes, receiving the image signals and the word signals encoded in similar codes, the codes corresponding to the written text being recognizable by a first series of numbers of rows of the page assigned to these written text codes with the codes corresponding to the spoken message being recognizable by means of a second series of numbers of rows of the page assigned to these spoken message codes, effecting the discrimination of the codes of the written text and the codes of the spoken message, storing the codes of the written text in a first group of memories, storing the codes of the spoken text in a second group of memories, causing tne association of the codes of the written text with the codes of the corresponding spoken message by means of an association table, reconstituting the spoken message from the codes contained in the second group of memories, and causing its audible emission, following a predetermined sequence, with the display of the corresponding written text on the screen of a cathode ray tube.

The invention also has as its object an apparatus for the coordination of the audition of spoken messages with the visualization of messages composed of pages on a display device characterized in that it includes means for memorizing the codes corresponding to a written text to be displayed, means for memorizing the codes corresponding to the spoken message to be reproduced, means for associating the text and the word corresponding to the codes stored in said memory means, means for memorizing the intonation elements of the audible segments forming the received message, means for memorizing the elements constituting the language in which the message is received, means for combining said intonation elements with said constituting elements, and means for synthesizing the message to be reproduced under control of said combining means.

The invention will be better understood with reference to the following description of a particular embodiment, which is set forth only as an example of the invention and with reference to the drawings.

FIG. 1a and 1b is a general schematic of a receiving station, for the display of teletext pages, of the teletext system "antiope", and for the audition of sound data corresponding to the teletext pages.

FIG. 2 shows the organization of a page of text to be reproduced in written and spoken form by means of the receiver of FIG. 1.

Figure 1A:
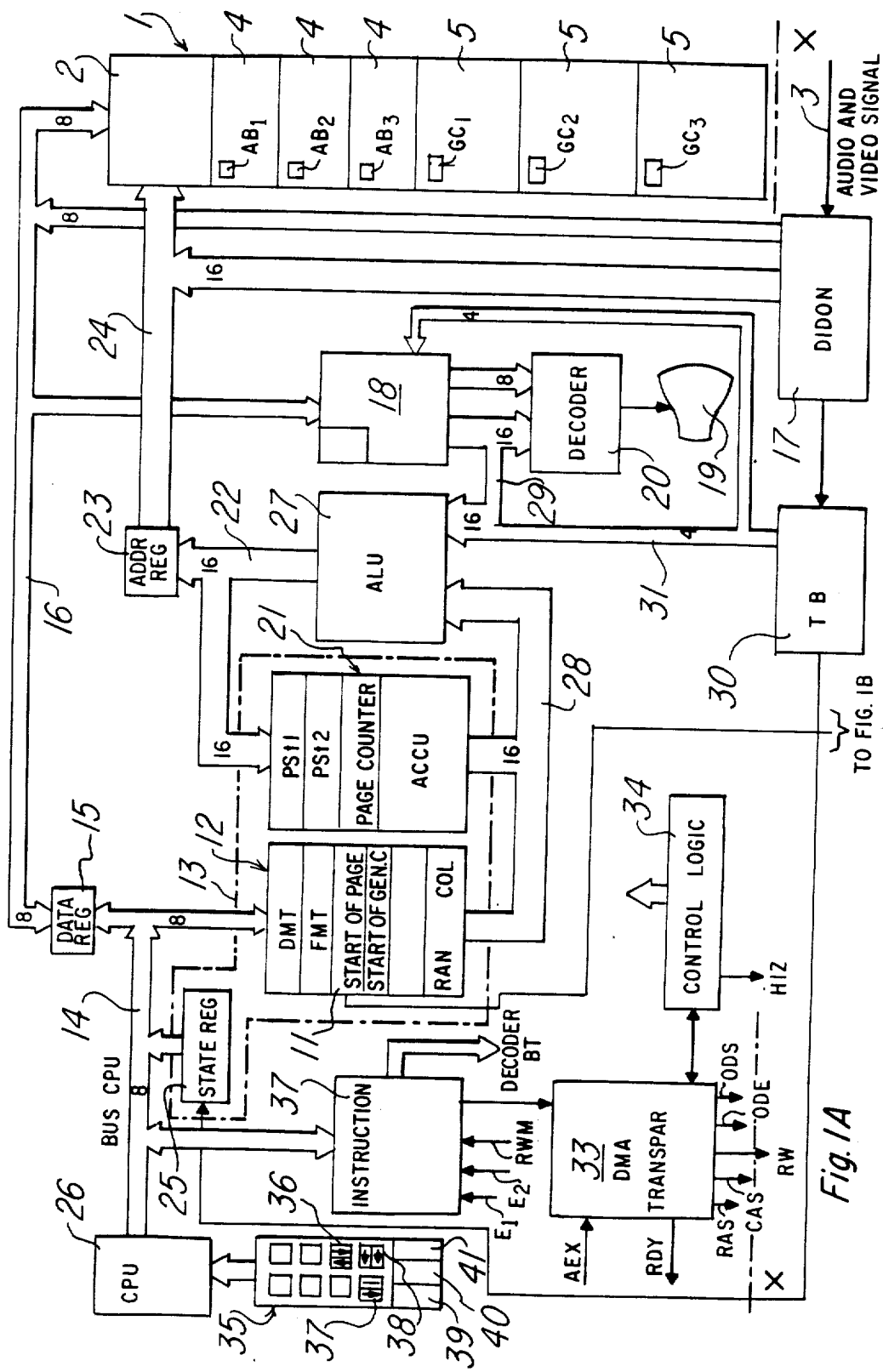

Before proceeding with the description of the invention itself, there will be presented some generalities as to the structure of the antiope video text system, to which the invention is applied.

This system provides for the transmission of digital information over non-utilized television lines.

Upon reception, the binary bits are grouped into bytes.

The antiope system effects the transmission of characters in the ASCII codes by means of herzian waves. The transmitted data are structured in the form of magazines or groups of pages.

A magazine includes generally a front page, a summary page, and information pages, these pages being numbered from zero to 999.

Each page has a heading setting forth its characteristics and a group of 25 rows numbered 0 to 24.

These 25 rows of codes correspond to the 25 rows of a television screen, each row containing 40 columns.

There are thus 1,000 character positions on the screen. To each of these positions there corresponds a word of sixteen binary bits contained in a display memory which identify the character to be displayed as well as its characteristics (size, color, etc.).

The ASCII code of the displayed character is utilized as an address by the display processor for reading into the alphabet memory of the assembly, the description of the form of the character.

It will be noted that this alphabet memory can be a RAM. In this case, the description of the characters to be displayed can itself be transmitted by the television channel in the form of a non-displayable special page. Such a technique allows the changing of the alphabet in a dynamic manner at the request of the user.

This technique is known as "dynamically redefinable character set" DRCS.

Other videotexted systems are of the "directory" terminal type. These systems utilize the same data coding system as the antiope system.

They differ from this system as to two principal points, these being the interactivity and the transmission support.

The directory terminal system is interactive. The user can select the transmitted pages. The user requests the emitting source to send the pages which are of interest. The transmission support is a standard telephone line. A modem is necessary for transmitting the digital data.

The receptor station seen in FIG. 1 which will now be described can provide spoken and written responses upon the user's request.

There is included a group of memories or composite memory 1, with various sections being assigned to data of different nature.

There is included a buffer memory 2 for temporarily storing the entry data with the separated video signals and audio signals applied to its terminal (arrow 3).

Such a buffer memory is described in detail in the above mentioned patent application No. 80 26 393 entitled "Process and Apparatus for the Exchange of Information Between Information Processing Systems Having Different Processing Speeds".

In addition, in the embodiment under consideration, the memory groups 1 has a plurality of zones 4 for storing information pages before display, these zones being called page memories, and has other zones 5 for storing character information, these being called character generators.

Zones 4 and buffer memory 2 are random access memories while zones 5 can be read only memories.

In addition to these memories for storing the data to be displayed, the memory group includes, according to the invention, zones for memorizing the data to be reproduced in an audible form, and, in particular, in a spoken form. These are zones 6 which constitute the memories for the pages to be spoken.

The number of zones 6 is equal to the number of zones 4 of the memories for the pages of the information to be displayed.

In this embodiment, there are three of these zones.

Memories 4 for the pages to be displayed, and memories 6 for the pages to be spoken, are connected to table 7 for text-word association.

Table 7 includes as many rows 8 as there are text memories 4.

Each row 8 includes register 9 containing the number of the corresponding page, register 10 containing the address of the text of this page to be displayed, and at least one address register corresponding to the language in which the commentaries are to be spoken.

In this embodiment, it is contemplated that the commentaries are to be spoken in any of three languages, namely, French, English, and German.

The table 7 includes, therefore, in each row, three address registers 10a, 10b, 10c for the three languages.

The association table 7 is connected to start of page register 11, which is a counter in register stack 12, this latter being a part of control circuit 13.

This control circuit effects the control of the contents of the buffer memory in a manner described in the above mentioned French patent application No. 80 26 393.

As indicated in said application, the start of buffer memory register DMT and of buffer memory register FMT, as well as other registers for storing addresses relating to other zones of memory group 1, make up a part of the register stack 12.

The register stack 12 is connected to a network including data bus 14 connected to a data register 15, which latter is itself connected by bus 16 to memory 1, to didon circuit separator 17 for the multiplex signal 3, and to means 18 for processing the typewritten and graphical data to be displayed on screen of tube 19, a decoder 20 being inserted between means 18 and tube 19.

The control circuit 13 also includes accumulator 21 connected to address bus 22 which communicates with address register 23 which is itself connected with the address input of the memory group 1 by means of bus 24.

State register 25, which also makes up a part of the control circuit 13, is connected to central processing unit 26.

The teletext display device also includes arithmetic and logic unit 27 which processes the addresses before they are sent to memory group 1, the addresses, on the one hand, from register stack 12, and accumulator 21 over bus 28 and, on the other hand, from device 18 over bus 29 which carries the addresses, in ASCII code, of the characters stored in character generators 5 of memory group 1. A time base circuit 30 connected to the didon separator device 17 and to other elements of the display device by bus 31 provides for the synchronization of the operations.

Control register 37 provides the control of the data circulating over the buses and direct access device 33, which is of the transparent type, effects the control of access to memory group 1.

A direct access device of this type is described in French patent application No. 77 31 140 filed Oct. 17, 1977 by the instant applicant.

The direct access device 33 is associated with control logic 34.

There is also included keyboard 35 which includes a key 36 for row by row vertical scanning in typographic mode, a key 37 for line by line vertical scanning of the image frame in typographic or graphic mode, and a key 38 for horizontal scanning of the image, and includes, in addition, keys 39 to 41 for selection of the language in which it is desired that the commentary accompanying the text be spoken.

Before continuing with the description of the receiving station of FIG. 1, there is given the following information as to the encoding and decoding technique for the audible signals.

The manner of reconstitution of the audible signals is a function of the manner in which these signals are encoded upon emission.

In the instant example, the word encoding technique utilizes a dictionary of stored audible segments and utilizes certain transitions between classes of audible segments. These elements are either simply concatonated or connected according to very simple rules.

Each language can be reproduced from a specific group of elementary sounds.

All of the words of a given language are constructed from these base sounds. The selection of audible segments and transitions is effected from the phonological transcription (in the form of phonemes) of the phrase to be synthesized.

The phonetic rules which operate as a function of the phonetic context, in which is placed the phoneme under consideration, allows for the selection of the elementary sounds.

This phase is called "phonetic-phonemic transcription". The phonemes are themselves obtained from the orthographic text by means of an algorithm of phonemic-ortographic transcription.

According to the phonetic-phonetic-orthographic code which is transmitted, these transcription algorithms are or are not read in via the antiope terminal.

Each audible segment of the dictionary thus constituted represents a sound adapted to be reproduced by a synthesizer circuit to which there is periodically sent a structure of data or elements.

Each audible segment corresponds therefore to a limited sequence of elements. The coding technique of the prosody consists in associating, to each element, two parameters, which parameters are, the duration of the element and the frequency of the fundamental sound of this element.

It is noted that the group of elements associated with each audible segment is invariable while the parameters representing the prosody vary with each word to be spoken.

The constitution of a word can be represented as follows:

[WORD] = (AUDIBLE SEGMENT$_1$) ... (AUDIBLE SEGMENT$_n$)]

An audible segment has the following constitution:

AUDIBLE
SEGMENT = {(Element$_1$) + duration$_1$ + fundamental $_1$] ...
(Element$_k$ + duration$_k$ + fundamental$_k$]}

If one takes into account the fact that the list of elements associated with an audible segment is invariable, it will be noted that each word to be spoken with a desired intonation is, in the end, characterized by the expression:

[number of audible segment + Σ (di,pi)]

in which:
d is the duration of the audible segment elemnt;
p is the fundamental frequency of the element;
i is the order of the element in the audible segment.

The transmission of a word becomes thus the transmission of the above sequence, assuming that, upon reception, there will be in the memory the list of the elements associated with each audible segment.

Returning to the architecture of the part of the device which effects the processing of the signals for generating the commentary associated with the displayed pages, there is seen a language memory 42 made up of three memories 42a, 42b, 42c associated respectively with address registers 10a, 10b, 10c for the three languages.

Each of these language memories includes as many rows 43 as exist sound segments necessary for the speaking of the language in question.

Each line 43 contains a number 44 of sound segments, as many couples 45 of terms (di, pi) as there are elements or "frames" in the corresponding audible segment.

The couples of terms (di, pi) determine the intonation of the phrases of the commentary.

The couples (di,pi) are the attributes of the elements making up the audible segments which are stored in memories 46a, 46b, 46c in the form of tables of elements constituting the audible segments for the respective languages.

Each of these memories, which are, in this case, read only memories, are adapted to store the accoustic parameters or coefficients of filters of formation of the language without intonation which, in association with the data memorized in the language memory 42a, 42b, or 42c, controls a word synthesizer 47 of the LPC type (linear predictive coding) of the TMS5220 type. In the present example, the language memories 42a to 42c and the tables of elements constituting the audible segments 46 are connected to synthesizer 47 by means of multiplexor 48.

The output of the synthesizer is connected to a loud speaker 49 which, if the cathode ray tube is a television tube, can also be the speaker of this television.

Instead of having as many read only memories 46a to 46c as there are programmed languages, one can also have a single RAM loaded in a dynamic manner with the audible segments corresponding to the desired language, and this under the prior control of the language selection which causes the input of the audible segments into the RAM.

The loading of the RAM is controlled by the central processing unit 26 which "awaits" a transmitted page containing the element making up the audible segments.

Upon the detection of this page, the RAM is loaded with audible segments of the selected language.

The changing of the language is effected by removing from the RAM the elements of the audible segments of the previously utilized language and in replacing them in an analogous manner by other elements.

The functioning of the device which has been described is as follows.

As is seen in FIG. 2, a page of text to be transmitted is subdivided into rows to which are assigned numbers.

As an example, there is assigned the numbers 0 to 24 to the rows of the written text to be transmitted and displayed.

The numbers 30 to 40 are assigned, for example, to the rows in which are written the codes corresponding to the word in French.

The numbers 41 to 50 are assigned to the rows in which are inscribed the codes corresponding to the word in English.

The numbers 51 to 60 are assigned to the rows in which are written the codes corresponding to the word in German.

The information in a page includes:
- A code of the start of the page
- A code of the page number
- A heading.

Thereafter, each row is marked by a code of the start of the row followed by a code of the number of the row which is adapted to provide a recognition of the association of the row to a written text or to a spoken text.

The number of the code of the row is in turn followed by codes of the information itself corresponding to the text to be displayed or spoken.

Upon the reception of the signal codes thus constituted, the central processing unit 26, which is preferably a microprocessor TMS7040, procedes with the discrimination of the rows of the written text and the rows of the spoken text and their storing in memories 4 or 6 according to their nature.

As this stage of functioning, if it is desired to display initially the text and to follow this display by a corresponding commentary, there is emitted the rows of each page in sequence in their natural order.

In such a case, the rows 0 to 24 corresponding to the written text are initially received at the input 3 and immediately displayed. The data relating to the word are only received thereafter.

If it is desired to display simultaneously with the sound, there is intermingled upon transmission the numbers of the rows of the written text and of sound according to a predetermined sequence.

Table 7 of text-word association for a page already decoded, the data of which are stored in written page memory 4 and spoken memory 6, is continually updated at the same time that the arranging of the word and text signals in the respective memories is carried out.

If the device functions in several languages, there is a transmission of the group of rows of each page corresponding to the texts spoken in all of the languages.

From this it results that all of the programmed languages are available at each instant at the reception level.

The selection of the language in which the commentary is to be spoken is effected by the user who activates one of the keys 38 to 41 of the keyboard 35.

The central processing unit 26 controls the association table 7 so that this can activate the language memory 42a to 42c and the table of constituting elements 46a to 46c corresponding to the selected language.

The data corresponding to a page to be spoken contained in one of the memories 6 are then transmitted to the corresponding language memory 42a to 42c and the audible segments formed of elements constituted by parameter couples (di, pi) of intonation are combined with the corresponding constituting elements contained in the table 46a to 46c associated with the memory of the language in question, in multiplexor 48 which controls, in its turn, the synthesizor 47.

The sounds thus synthesized are emitted by the loud speaker in a predetermined sequence with the text displayed on the screen of the cathode ray tube 19.

In the following list, there is indicared as an example the elements capable of effecting the functions of the various circuits in FIG. 1b.

| | |
|---|---|
| Memory 6<br>Memory 7<br>Memories 42a to 42c | TMS 4164 |
| Separator circuit 17 | TMS 3534<br>SN 96533 |
| Synthesizor 47 | TMS 5220 |
| Multiplexor 48 | Function of microprocessor 26 (Fig. 1A) TMS 7040. |

All of these components are manufactured and sold by the applicant.

We claim:

1. A system for displaying text on a video screen and for generating output from an audio speaker corresponding to said displayed text, comprising:
   a text memory for storing the text data to be displayed on said video display;
   a video controller, connected to said video screen and to said text memory, for addressing said text memory and for communicating the text data from said text memory to said video display in displayable form;
   a first language memory for storing audio data comprised of sequences of paired values, each sequence corresponding to a phonetic element in a first language, one of said paired values corresponding to a frequency and the other of said paired values corresponding to a duration;
   a second language memory for storing audio data comprised of sequences of said paired values, each sequence corresponding to a phonetic element in a second language;
   a speech synthesizer, connected to said first and second language memories and to said audio speaker, for driving said audio speaker with an analog signal corresponding to frequency and duration data received from said language memories;
   a phonetic memory comprised of a plurality of memory locations, each storing a value corresponding to an address of said first language memory and a value corresponding to an address of said second second language memory;
   an address register, connected to said phonetic memory and to said first and second language memories, comprised of a first word location and a second word location;
   a central processing unit, connected to said phonetic memory and to said address register, for loading the contents of a sequence of memory locations of said phonetic memory into said address register, said sequence of memory locations representative of the spoken version of the text to be displayed by said video display; and
   language select means, connected to said address register, for selecting either said first word location or said second word location of said address register to be applied to either said first language memory or said second language memory, respectively.

2. The system of claim 1, wherein said text memory stores a plurality of pages of text data, each of said pages addressable by said video controller and having a page address in said text memory;
   wherein said memory locations in said phonetic memory also store a value corresponding to the page address of the text data containing the corresponding phonetic element;
   and wherein said video controller contains a start-of-page register, said start-of-page register storing the page address of the desired page of said text memory and the corresponding locations in said phonetic memory.

3. The system of claim 2, further comprising a didon for receiving text data and phonetic data from an input port, said didon connected to said text memory and to said phonetic memory;
   and wherein said central processing unit is also connected to said text memory, and is for addressing said text memory and said phonetic memory so that the text data received by said didon is stored in said text memory and so that the phonetic data is stored in said phonetic memory.

4. The system of claim 3, wherein said language select means comprises:
   a user input device, connected to said central processing unit, for communicating a signal to said central processing unit selecting said first or said second language;
   wherein said central processing unit controls said address register to present either said first word of said address register to said first language memory or said second word of said address register to said second language memory, responsive to said signal from said user input device.

5. The system of claim 4, wherein said user input device is a keyboard.

* * * * *